US012451304B2

(12) United States Patent
Kauh

(10) Patent No.: US 12,451,304 B2
(45) Date of Patent: Oct. 21, 2025

(54) COMPUTER INPUT DEVICE

(71) Applicant: ELASTO LC, Incheon (KR)

(72) Inventor: Ye Woon Kauh, Seoul (KR)

(73) Assignee: ELASTO LC, Incheon (KR)

( * ) Notice: Subject to any disclaimer, the term of this patent is extended or adjusted under 35 U.S.C. 154(b) by 0 days.

(21) Appl. No.: 18/018,429

(22) PCT Filed: Jul. 22, 2022

(86) PCT No.: PCT/KR2022/010754
§ 371 (c)(1),
(2) Date: Jan. 27, 2023

(87) PCT Pub. No.: WO2023/027347
PCT Pub. Date: Mar. 2, 2023

(65) Prior Publication Data

US 2024/0258048 A1 Aug. 1, 2024

(30) Foreign Application Priority Data

Aug. 26, 2021 (KR) ........................ 10-2021-0112999
Dec. 29, 2021 (KR) ........................ 10-2021-0191333

(51) Int. Cl.
*H01H 13/12* (2006.01)
*H01H 13/20* (2006.01)

(52) U.S. Cl.
CPC ............ *H01H 13/12* (2013.01); *H01H 13/20* (2013.01)

(58) Field of Classification Search
CPC .......... H01H 13/12; H01H 13/20; H01H 3/12; H01H 3/125; H01H 13/14; H01H 13/70; H01H 13/7065; H01H 13/7073
See application file for complete search history.

(56) References Cited

U.S. PATENT DOCUMENTS 3,707,609 A 12/1972 Dapot et al.
4,467,160 A 8/1984 Murmann et al.
5,442,152 A * 8/1995 Huang ................. H01H 13/705 200/341
5,456,541 A * 10/1995 Ching-Shui ................ B41J 5/12 200/345

(Continued)

FOREIGN PATENT DOCUMENTS

GB 2136633 A 9/1984
GB 2288070 A 10/1995

(Continued)

OTHER PUBLICATIONS

International Search Report from WIPO in Application No. PCT/KR2022/010754 dated Oct. 20, 2022.

*Primary Examiner* — Lheiren Mae A Caroc
(74) *Attorney, Agent, or Firm* — DILWORTH IP, LLC

(57) ABSTRACT

A computer input device includes a button that is movable by an external force; an elastic unit that is positioned on a lower portion of the button, is deformed or compressed by the movement of the button, and provides an elastic force in response to the movement of the button; and a switch that is turned on or off by the movement of the button, wherein the button is movable in an on section, which is a section from an uppermost end position to a position where the switch is turned on, and an extra section, which is a section up to a position that is lower than the on section.

11 Claims, 12 Drawing Sheets

(56) References Cited

U.S. PATENT DOCUMENTS

| | | | | |
|---|---|---|---|---|
| 6,765,164 | B2 * | 7/2004 | Lee | H01H 13/52 200/341 |
| 10,490,369 | B1 | 11/2019 | Tsai et al. | |
| 2020/0152402 | A1 | 5/2020 | Su et al. | |

FOREIGN PATENT DOCUMENTS

| | | | |
|---|---|---|---|
| JP | H01302621 | A | 12/1989 |
| JP | H04167316 | A | 6/1992 |
| JP | H06012941 | A | 1/1994 |
| KR | 10-1989-0005313 | B1 | 12/1989 |
| KR | 10-2001-0037965 | A | 5/2001 |
| KR | 10-2017-0016660 | A | 2/2017 |

* cited by examiner

COMPUTER INPUT DEVICE

FIELD OF THE INVENTION

The present disclosure relates to a computer input device, and more particularly, to a computer input device, that can not only reduce the impact applied to the hand, but also reduce the noise.

BACKGROUND OF THE INVENTION

A push-type switch refers to a switch that operates an electrical switch when the switch is pressed by a hand. The push-type switch may be divided into a metal dome membrane-type switch, a rubber dome membrane-type switch, a mechanical switch, an optical switch, and the like.

Examples of conventional push-type switches are shown in FIGS. 1A-1D. FIG. 1A shows a metal dome membrane-type switch, FIG. 1B shows a rubber dome membrane-type switch, FIG. 1C shows a mechanical switch, and FIG. 1D shows an optical switch.

Operation methods of the metal dome membrane-type switch and the rubber dome membrane-type switch are as follows.

When an external force (press by a user) is applied, a button moves in a downward direction, and a membrane is deformed by the external force transmitted through the button to come into contact with a switch. The switch is positioned on a printed circuit board (PCB) and may be electrically turned on through contact with the membrane.

When the external force is released, the button may return to its original position (uppermost end position) by an elastic force of the membrane in an upward direction. In addition, since the membrane returns to its original shape by the elastic force, contact between the membrane and the switch is released, and through this, the switch may be turned off.

An operation method of the mechanical switch is as follows.

In a basic state in which no external force is applied, since a button protrusion formed on the button is in contact with the switch, the switches are disconnected and are in an off state.

When an external force is applied, the button goes down in a downward direction due to this external force, and the button protrusion also goes down in a downward direction together. Since the contact between the button protrusion and the switch is released when the button protrusion goes down in a downward direction, the switches come into contact with each other and may be in an on state.

When the external force is released, the button ascends due to an elastic force of a spring in an upward direction, and the button protrusion also ascends in an upward direction together. As a result, the button protrusion and the switch come into contact with each other again, and the contact between the switches is released so that the switches may be in an off state.

An operation method of the optical switch is as follows.

In a basic state in which no external force is applied, light irradiated from an optical transmitter is normally sensed by an optical receiver so that switches (the optical transmitter and the optical receiver) are in an off state.

When an external force is applied, the button goes down in a downward direction due to this external force, and a button center rod formed on the button also goes down in a downward direction together. As a result, light transmission between the optical transmitter and the optical receiver is blocked by the button center rod so that the switches may be in an on state.

When the external force is released, the elastic force by the spring acts on the button in an upward direction so that the button ascends, and the button center rod also ascends in an upward direction together. As a result, light irradiated from the optical transmitter is recognized again by the optical receiver so that the switches may be in an off state.

In the conventional switches described above, the movement of the button that goes down in a downward direction by an external force may be largely divided into two types of movements. One of the movements of the button is a preliminary movement, a movement in which the button moves from the uppermost end position (basic state) until the switch is turned on, and the other is a residual movement, a movement in which the switch additionally goes down after the switch is turned on.

If a movement distance of the button in the preliminary movement is D1 and a movement distance of the button in the residual movement is D2, the total movement distance of the button is D=D1+D2. If a movement time of the button in the preliminary movement is t1 and a movement time of the button in the residual movement is t2, the total movement time of the button is t=t1+t2.

The movement distance and movement time in the preliminary movement and residual movement of the conventional switches described above are as follows.

TABLE 1

| Push-type switch | D (mm) | D1 (mm) | D2 (mm) |
|---|---|---|---|
| Metal dome membrane-type switch | 1 | 1 | 0 |
| Rubber dome membrane-type switch | 3 | 2.5 | 0.5 |
| Mechanical switch | 4 | 2 | 2 |
| Optical switch | 4 | 2 | 2 |

Referring to Table 1, D2 has a value between 0 and 2 mm. That is, when a user uses a keyboard (a computer input device), the button stops only after it moves further by 0 to 2 mm due to the inertia of pressing provided by the user even after the switch is turned on.

Stopping after further moving by 0 to 2 mm occurs since the switch or membrane that is going down in a downward direction collides with a PCB. Since the PCB corresponds to a rigid body having large rigidity, a stop due to a collision with the PCB corresponds to a sudden stop. Therefore, this collision not only applies an impact force to the user's hand, but also generates noise due to the collision with the PCB that is a rigid body.

If the impact force applied to the user's hand and the noise are temporary or one-time, there may not be much difficulty. However, since typing of a large number of words is performed in a very short time when typing is generally performed, an impact force is continuously and repeatedly applied to the user's hand, and noise is also repeatedly and continuously generated.

SUMMARY OF THE INVENTION

In order to solve the aforementioned problems, one embodiment of the present disclosure is directed to providing a device that can reduce or eliminate the impact force applied to the user's hand and can also reduce noise by using a buffer means or an impact prevention means.

According to one embodiment of the present disclosure, there is provided a computer input device including: a button that is movable by an external force; an elastic unit that is positioned on a lower portion of the button, is deformed or compressed by the movement of the button, and provides an elastic force in response to the movement of the button; and a switch that is turned on or off by the movement of the button, wherein the button is movable in an on section, which is a section from an uppermost end position to a position where the switch is turned on, and an extra section, which is a section up to a position that is lower than the on section.

According to one embodiment of the present disclosure, it is possible to reduce or eliminate the impact force applied to the user's hand using a computer input device.

Further, according to another embodiment of the present disclosure, it is possible to reduce noise that may be generated when using the computer input device through the reduction or elimination of the impact force.

The effects obtainable in the present disclosure are not limited to the effects mentioned above, and other effects which are not mentioned herein will be clearly understood from the following descriptions by those skilled in the art to which the present disclosure pertains.

DETAILED DESCRIPTION

Figure 1A:
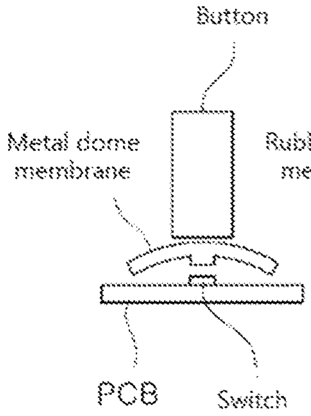
FIGS. 1A-1D are respective schematic views of respective conventional push-type switches.
Figure 1B:
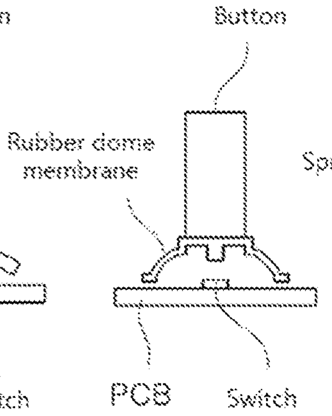
Figure 1C:
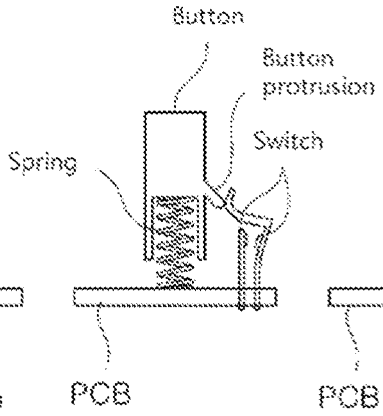
Figure 1D:
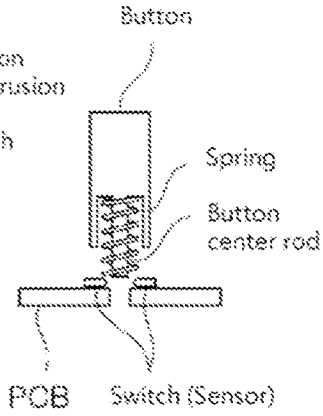

According to one embodiment of the present disclosure, there is provided a computer input device including: a button that is movable by an external force; an elastic unit that is positioned on a lower portion of the button, is deformed or compressed by the movement of the button, and provides an elastic force in response to the movement of the button; and a switch that is turned on or off by the movement of the button, wherein the button is movable in an on section, which is a section from an uppermost end position to a position where the switch is turned on, and an extra section, which is a section up to a position that is lower than the on section.

Hereinafter, embodiments of the present disclosure will be described in detail with reference to the accompanying drawings so that those skilled in the art to which the present disclosure pertains can easily practice the present disclosure. However, the present disclosure may be embodied in many different forms and is not limited to the embodiments described herein. And in order to clearly explain the present disclosure, parts irrelevant to the description are omitted from the drawings, and similar reference numerals are imparted to similar parts throughout the specification.

The terms used in the present disclosure are general terms that are currently used as widely as possible in consideration of the functions in the present disclosure, but may vary according to the intention of a person skilled in the art, precedents, new technology emergence, etc. In addition, in a specific case, there is also a term arbitrarily selected by the applicant, and in this case, the meaning thereof will be described in detail in the description of the invention. Therefore, the term used in the present disclosure should be defined based on the meaning of the term and the overall content of the present disclosure, not the simple name of the term.

When it is said that a certain part "includes" a certain component throughout the specification, it means that it may further include other components without excluding other components unless there is a specifically opposite description. In addition, a term such as " . . . unit" or "module" described in the specification mean a unit that processes at least one function or operation, which may be implemented as hardware or software or a combination of hardware and software. In addition, when a part is said to be "connected" to another part throughout the specification, this includes not only the case where the parts are "directly connected" to each other but also the case where the parts are connected to each other "with another element interposed therebetween".

Figure 2:
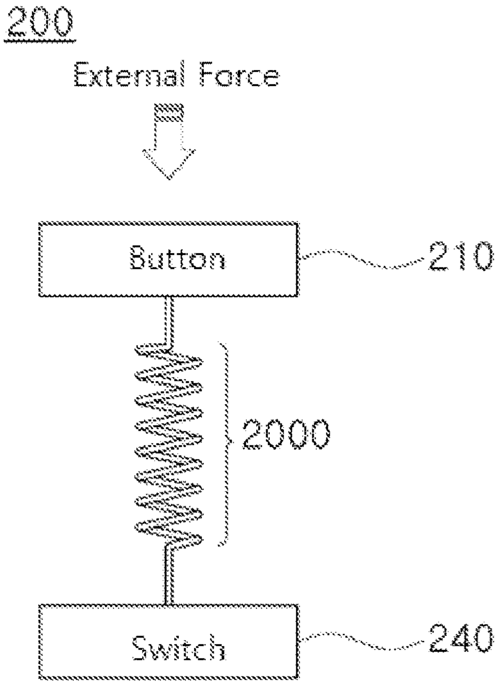
FIG. 2 is a schematic view of a computer input device according to the present invention.

An exemplary view for explaining an example of a computer input device 200 according to the present disclosure is shown in FIG. 2, and views for explaining various examples of an elastic unit 2000 according to the present disclosure are shown in FIGS. 3A, 3B and FIGS. 4A, 4B.

As shown in FIG. 2, the computer input device 200 may be configured by including a button 210, the elastic unit 2000, and a switch 240.

The button 210 is a configuration to which an external force (press by a user) is applied, and is movable in a downward direction from the uppermost end position (basic state) to the lowermost end position by this external force. In addition, when the external force is released, the button 210 is movable up to the uppermost end position in an upward direction by the elastic force provided by the elastic unit 2000.

A section in which the button 210 is movable may be largely divided into two sections. The first section is an 'on section' from the uppermost end position to the position where the switch 240 is turned on, and the second section is an 'extra section' up to the position lower than the position where the switch 240 is turned on.

According to the embodiment, the section in which the button 210 is movable may have a value of 1 or more obtained by dividing the extra section by the on section. That is, the length of the extra section may be implemented longer than the length of the on section. For example, the on section may be implemented to be 2 mm and the extra section may be implemented to be 3 mm, or the on section may be implemented to be 2 mm and the extra section may be implemented to be 4 mm.

When the user hits the button 210 of the computer input device 200, the button 210 collides with a PCB 400 (i.e., the bottom) of the computer input device 200, which is referred to as bottom out. The impact generated by such bottom out transmits an impact force to the user's fingers.

However, since the computer input device 200 according to one embodiment of the present disclosure has the extra section with a sufficient length capable of avoiding bottom out, the impact force transmitted to the user's fingers may be reduced.

Since the lowest position to which the button 210 can be lowered by the user's external force may vary depending on the magnitude of the external force, the length of the extra section may also vary depending on the magnitude of the external force.

The sum of the lengths of the on section and the extra section may be 4 mm or more, or 5 mm or more. That is, the button 210 may go down in a downward direction by 4 mm or more, or 5 mm or more. According to the embodiment, the sum of the lengths of the on section and the extra section may be 8 mm or more. That is, the button 210 may go down in a downward direction by 8 mm or more.

Referring to Table 1, in the conventional switch, the button may go down from 1 mm to a maximum of 4 mm, but in the computer input device 200 according to the present disclosure, the button 210 may go down by 4 mm or more, 5 mm or more, or 8 mm or more. Therefore, compared to the conventional switch, in the computer input device 200 according to the present disclosure, the button 210 is configured to have a longer lowerable length (descending length).

Therefore, in the computer input device 200 according to the present disclosure, even if the button 210 additionally descends due to the inertia of an external force after the switch is turned on, a collision between the button 210 and other configuration may not occur or the amount of impact caused by the collision may be remarkably reduced.

The elastic unit 2000 is positioned on a lower portion of the button 210 and may be deformed or compressed by the movement of the button 210. Since the elastic unit 2000 is a configuration having an elastic force, it may provide an elastic force to the button 210 in response to the movement of the button 210. Since the button 210 has a descending length of 4 mm or more or 8 mm or more, the elastic unit 2000 may also be deformed or compressed by 4 mm or more or 8 mm or more. The switch 240 corresponds to a configuration that is turned on or off by the movement of the button. The switch 240 may be implemented in a form attached to a PCB (not shown). In addition, the switch 240 may be implemented as two switches that are turned on or off (mechanical switch) according to whether or not they are in contact with each other or may be implemented as an optical transmitter and an optical receiver (optical switch).

The elastic unit 2000 may be implemented as one physical configuration or a combination of two different physical configurations.

When the elastic unit 2000 is implemented as one physical configuration, the elastic unit 2000 may correspond to a spring having the same elastic modulus throughout the entire elastic unit 2000, or may correspond to a continuous spring having an elastic modulus that continuously increases or decreases in a downward or upward direction.

Figure 4A:
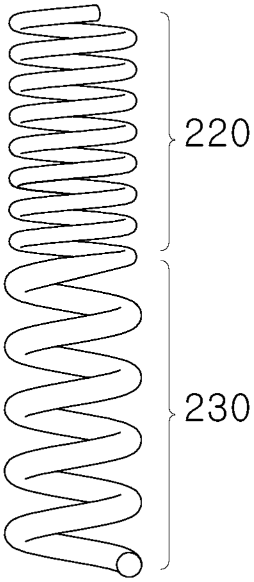
FIGS. 4A and 4B are side views of respective elastic units according to the present invention.
Figure 4B:
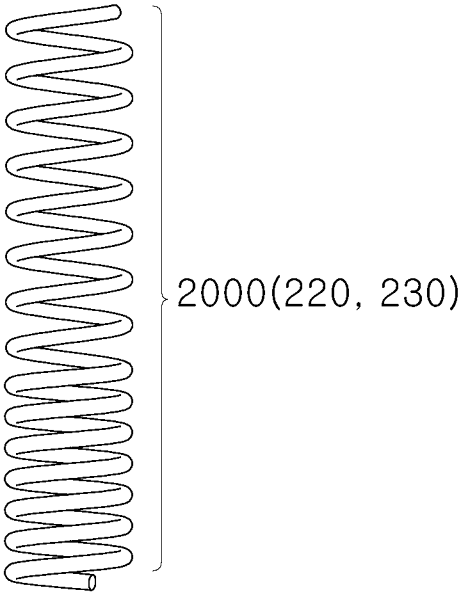

When the elastic unit 2000 is implemented as a combination of two different physical configurations, the elastic unit 2000 may be divided into a first elastic unit 220 and a second elastic unit 230 as shown in FIGS. 4A and 4B.

The first elastic unit 220 is a configuration of providing an elastic force to the button 210 in an upward direction, and may be positioned below (lower portion of) the button 210 as shown in FIG. 2. The first elastic unit 220 has an elastic modulus, and hereinafter, the elastic modulus of the first elastic unit 220 will be referred to as 'a first elastic modulus k1'.

The second elastic unit 230 is a configuration of providing an elastic force to the button 210 in an upward direction, and may be positioned below the first elastic unit 220 as shown in FIG. 2. The elastic force provided by the second elastic unit 230 may be provided to the button 210 through the first elastic unit 220, and the user's external force may be provided to the second elastic unit 230 through the button 210 and the first elastic unit 220. The second elastic unit 230 has an elastic modulus, and hereinafter, the elastic modulus of the second elastic unit 230 will be referred to as 'a second elastic modulus k2'.

The first elastic modulus of the first elastic unit 220 and the second elastic modulus of the second elastic unit 230 may be 1) different from each other or 2) equal to each other.

In the example of 1), the fact that the first elastic modulus and the second elastic modulus are different from each other may include both of a case where the first elastic modulus is larger than the second elastic modulus and a case where the first elastic modulus is smaller than the second elastic modulus.

When a user's external force is applied to the button 210 when the first elastic modulus and the second elastic modulus are different from each other, deformation (downward deformation or compression) occurs first in the elastic unit having a relatively small elastic modulus value out of the first elastic unit 220 and the second elastic unit 230, and then deformation of the elastic unit having a relatively large elastic modulus value occurs later.

For example, when the value of the first elastic modulus is larger than the value of the second elastic modulus, deformation of the second elastic unit 230 occurs first so that the elastic force of the second elastic unit 230 may act in a direction opposite to the external force. When the second elastic unit 230 is maximally compressed, the second elastic unit 230 functions as a rigid body thereafter. If the external force continues even after the moment when the second elastic unit 230 functions as a rigid body, deformation of the first elastic unit 220 starts so that the elastic force of the first elastic unit 220 may act in a direction opposite to the external force.

Since the first elastic unit 220 has a relatively larger elastic modulus than the second elastic unit 230, the elastic force provided by the first elastic unit 220 is larger than the elastic force provided by the second elastic unit 230.

In the example of 2), although the first elastic modulus and the second elastic modulus are equal to each other, the present disclosure may be configured so that the first elastic unit 220 is included in a compressed state in a basic state in which no external force is applied to the button 210. When the first elastic unit 220 is included in a compressed state, the elastic force provided by the first elastic unit 220 becomes larger than the elastic force provided by the second elastic unit 230.

The examples of 1) and 2) are summarized as follows.

First, in the on section, an elastic unit (small elastic unit) having a relatively small elastic modulus or providing a relatively small elastic force is compressed, and the small elastic unit is maximally compressed and functions as a rigid body. The point at which the small elastic unit functions as a rigid body may belong to the on section or the extra section.

Next, if the external force continues even after the moment when the small elastic unit functions as a rigid body, compression of an elastic unit (large elastic unit) having a relatively large elastic modulus or providing a relatively large elastic force starts. The point at which compression of the large elastic unit starts may be a starting point of the extra section or lower than the starting point. Thus, compression of the large elastic unit may occur in the entirety or portion of the extra section.

Since the elastic force provided by the large elastic unit is larger than the elastic force provided by the small elastic unit, the additional descent of the button 210 in the extra section is further hindered by a large elastic force. That is, the large elastic unit may act as a buffer means for buffering an impact force or act as an impact prevention means for preventing the impact force.

Therefore, according to the computer input device 200 according to the present disclosure, it may be possible to reduce or eliminate the impact force applied to the user's hand.

In addition, according to the computer input device 200 according to the present disclosure, it may be possible to reduce noise that may generate when using the computer input device 200 through reduction or elimination of the impact force.

Meanwhile, in order to emphasize the elastic force of the first elastic unit 220 and the second elastic unit 230 in FIG. 2, both of the first elastic unit 220 and the second elastic unit 230 are expressed in the form of a spring. However, the first elastic unit 220 and the second elastic unit 230 may be implemented in other forms such as a metal dome membrane or a rubber dome membrane as well as the spring form.

Figure 3A:
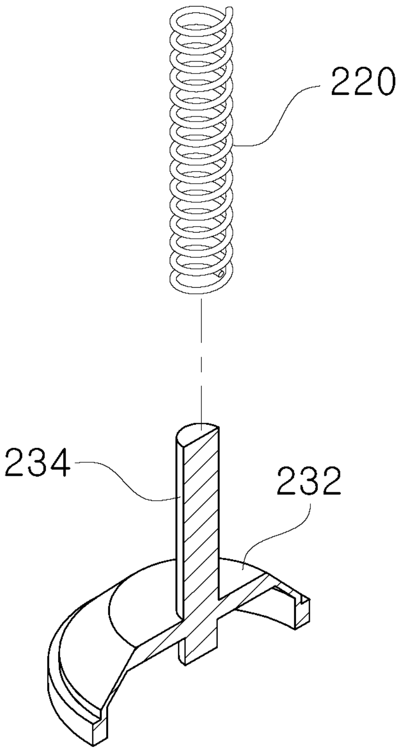
FIGS. 3A and 3B are exploded cross-sectional views of respective elastic units according to the present invention.

For example, as shown in FIG. 3A, the second elastic unit 230 may be implemented as a membrane including a membrane main body 232 and a membrane protrusion portion 234 formed to protrude upward therefrom (from the upper portion of the membrane main body).

The first elastic unit 220 in the form of a spring may be fitting-coupled to the membrane protrusion portion 234, and through this, it is possible to stably maintain the position of the first elastic unit 220 and provide the elastic force thereof.

Figure 3B:
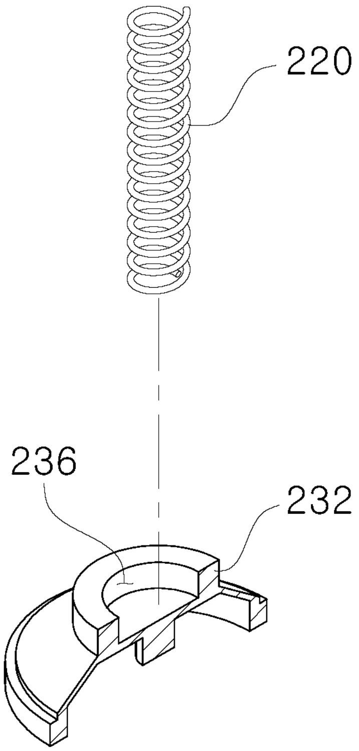

As another example, as shown in FIG. 3B, the second elastic unit 230 may also be implemented as a membrane including a membrane main body 232 and a membrane groove portion 236 formed in the upper portion of the membrane main body 232. The first elastic unit 220 may be positioned in the membrane groove portion 236, and through this, it is possible to stably maintain the position of the first elastic unit 220 and provide the elastic force thereof.

Meanwhile, as shown in FIGS. 4A and 4B, the first elastic unit 220 and the second elastic unit 230 may be implemented as (discontinuous) springs having different discontinuous elastic moduli (FIG. 4A), or may also be implemented as a (continuous) spring having an elastic modulus that continuously changes (FIG. 4B).

The discontinuous spring refers to a spring having elastic modulus that changes discontinuously while passing through close contact points of the springs 220 and 230. That is, the discontinuous spring is a spring whose pitch changes discontinuously.

When the elastic unit 2000 is implemented as a continuous spring, if an external force is applied to the button 210, compression or close contact occurs from a part having a relatively short (dense) pitch. If the external force continues in this state, compression of a part having a relatively long pitch also occurs. The part having a relatively short pitch corresponds to a part having a relatively small elastic modulus, and the part having a relatively long pitch corresponds to a part having a relatively large elastic modulus. Through these sequential compressions, the continuous spring may equally perform the buffer function or impact prevention function of the discontinuous spring described above.

Example 1—Rubber Dome Membrane Type

Figure 5:
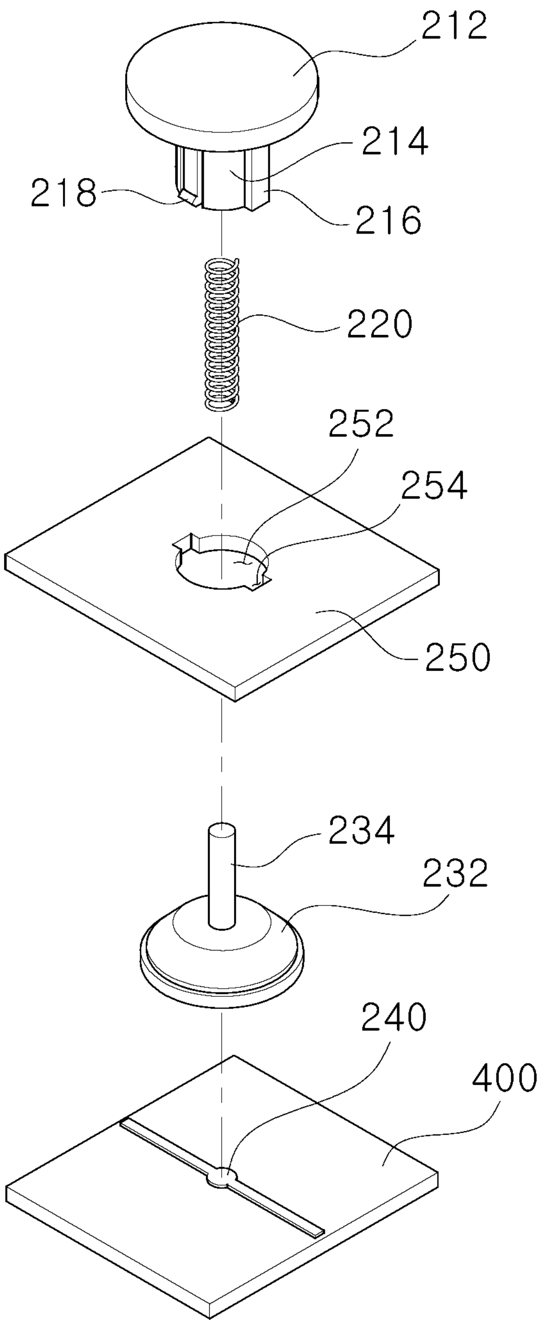
FIG. 5 is an exploded perspective view of rubber dome membrane-type computer input device according to the present invention.
Figure 6:
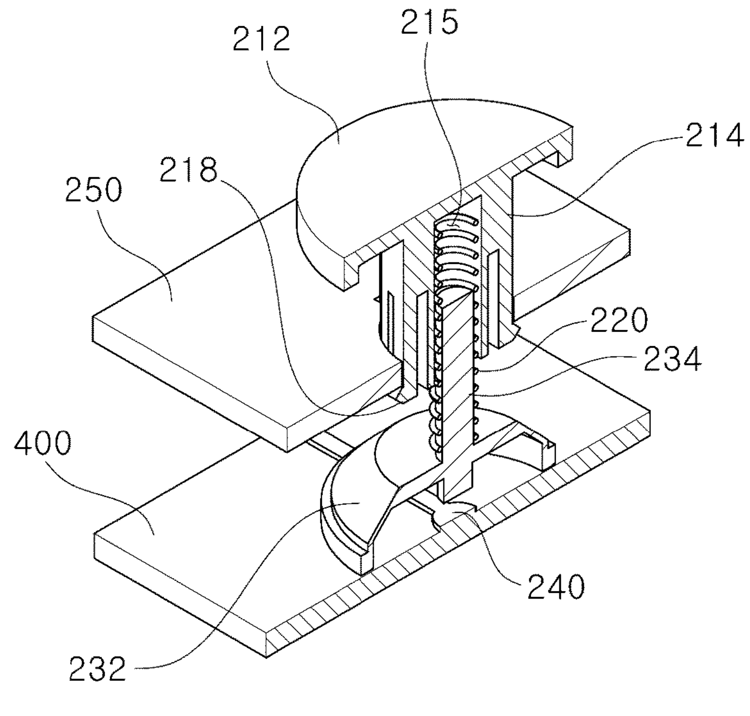
FIG. 6 is a prespective cross-sectional view of the computer input device of FIG. 5.

Example 1 is an example of a rubber dome membrane-type computer input device 200. FIG. 5 shows an exploded perspective view of the rubber dome membrane-type computer input device 200, and FIG. 6 shows a cross-sectional view of the rubber dome membrane-type computer input device 200.

The rubber dome membrane-type computer input device 200 may be configured by including a button 210, a spring (first elastic unit 220), a rubber dome membrane (second elastic unit 230), and a switch 240.

The button 210 may be configured by including a cap unit 212 and an extension unit 214. The cap unit 212 is positioned on an upper portion of the button 210, and corresponds to a configuration to which an external force is applied. The extension unit 214 is formed to extend from a lower portion of the cap unit 212, and may have therein a space (groove portion 215) with an open lower side.

A portion or entirety of the spring 220 may be mounted in the groove portion 215, and through this, it is possible to implement stable position maintenance and stable elastic force provision of the spring 220.

The rubber dome membrane 230 may include a membrane main body 232 and a membrane protrusion portion 234. The spring 220 may be fitting-coupled to the membrane protrusion portion 234, and through this, it is possible to implement stable position maintenance and stable elastic force provision of the spring 220. The switch 240 may be implemented in a form coupled to the PCB.

According to the embodiment, the rubber dome membrane-type computer input device 200 may be configured by further including a fixing unit 250.

A through hole 252 may be formed in the fixing unit 250, and the extension unit 214 may be through-coupled to the through hole 252. Through this through coupling, movements in upward and downward directions of the extension unit 214, that is, the button 210, may be guided stably.

According to the embodiment, one or more sliding protrusions 216 may be formed to protrude from the side surface of the extension unit 214, and a sliding slot 254 to which the sliding protrusions 216 are fitting-coupled may be formed in the through hole 252.

When the sliding protrusions 216 are fitting-coupled to the sliding slot 254, rotation of the extension unit 214 or the button 210 is prevented in a state where the extension unit 214 is through-coupled to the through hole 252. Therefore, the button 210 may be driven more stably, and furthermore, the computer input device 200 itself may be driven more stably.

According to the embodiment, one or more hooking protrusion portions 218 may be formed to protrude from the lower portion of the side surface of the extension unit 214. Since the hooking protrusion portions 218 are hooking-coupled to the lower portion of the fixing unit 250 in a state where the extension unit 214 is through-coupled to the through hole 252, a phenomenon in which the button 210 is separated from the through hole 252 may be prevented.

FIGS. 7A-7D are views showing the operation method of the rubber dome membrane-type computer input device 200. In FIGS. 7A-7D, it is assumed that the elastic modulus of the spring 220 is larger than the elastic modulus of the rubber dome membrane 230.

Figures 7A, 7B, 7C, 7D:
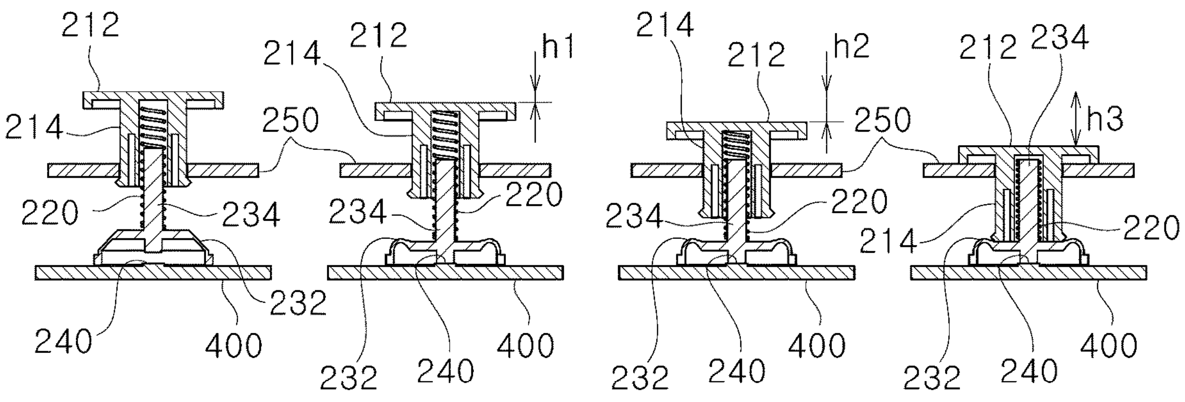
FIGS. 7A-7D are cross-sectional views of the computer input device of FIG. 6 in varying positions of operation.

FIG. 7A shows a basic state in which no external force is applied.

In this case, the button 210 is positioned at the uppermost end, the spring 220 has a free length that is not compressed or deformed, and the rubber dome membrane 230 is also in a basic state that is an uncompressed or undeformed state.

FIG. 7B shows a state in which the switch 240 is turned on as an external force is applied thereto. That is, (FIG. 7B shows an operation in the on section.

The button 210 descends by h1 due to the applied external force, and the spring 220 is hardly compressed or is compressed to have a very small length due to a relatively large elastic modulus thereof. The rubber dome membrane 230 is compressed in a downward direction by h1 or a length adjacent to h1 due to a relatively small elastic modulus thereof.

The compressed rubber dome membrane 230 touches the switch 240 so that the switch 240 is turned on. Since the rubber dome membrane 230 is in a state of being in contact with the switch 240, it can no longer be compressed in a downward direction. That is, the rubber dome membrane 230 acts as a rigid body.

FIG. 7C shows a state in which the external force is sustained due to the inertia of the user's pressing. That is, FIG. 7C shows an operation in the extra section.

Since the rubber dome membrane 230 can no longer be compressed in a downward direction, compression or deformation due to an external force occurs in the spring 220. That is, the spring 220 is compressed in a downward direction by a length of h2-h1.

Since the spring 220 has a relatively large elastic modulus, a relatively larger elastic force (elastic force of the spring) than that of the case of FIG. 7C acts in a direction opposite to the external force. Accordingly, the user's pressing is further hindered by the large elastic force, and as a result, the lowering speed of the button 210 due to the user's pressing is reduced.

FIG. 7D shows a state in which the button 210 no longer descends.

As a result of the user's pressing being further hindered by the large elastic force, the user's external force and the elastic force cancel each other out so that the button 210 does not descend. In this case, the spring 220 is additionally compressed by a length of h3-h2 compared to the case of FIG. 7C.

Example 2—Metal Dome Membrane Type

Figure 8:
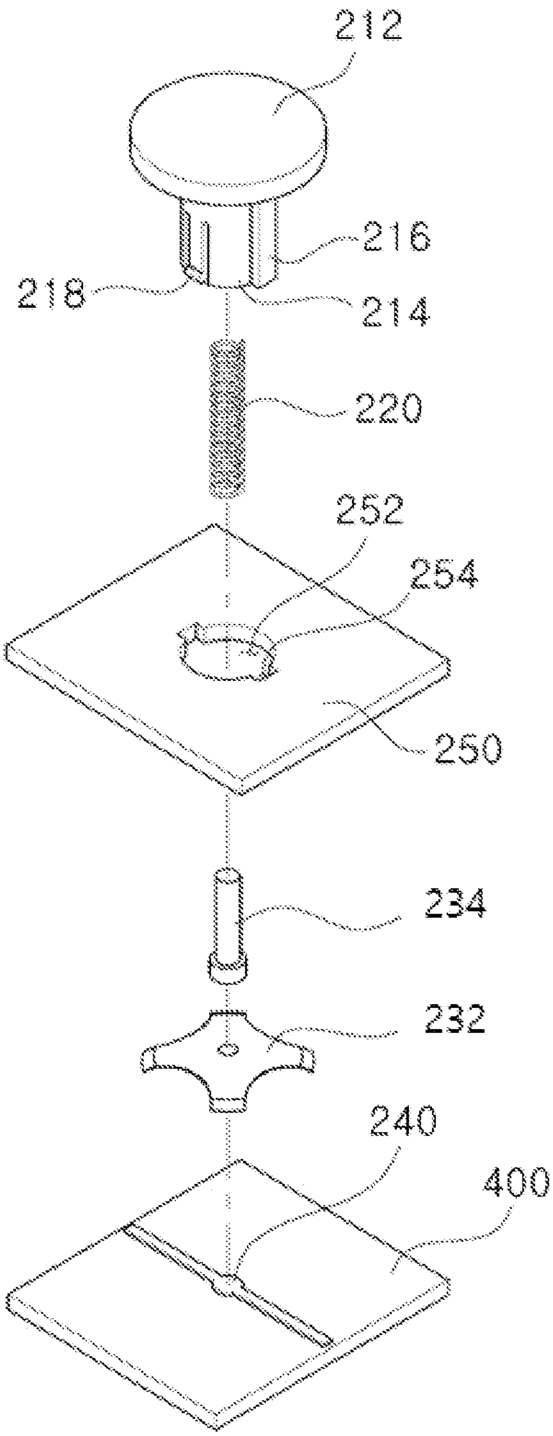
FIG. 8 is an exploded perspective view of metal dome membrane-type computer input device according to the present invention.
Figure 9:
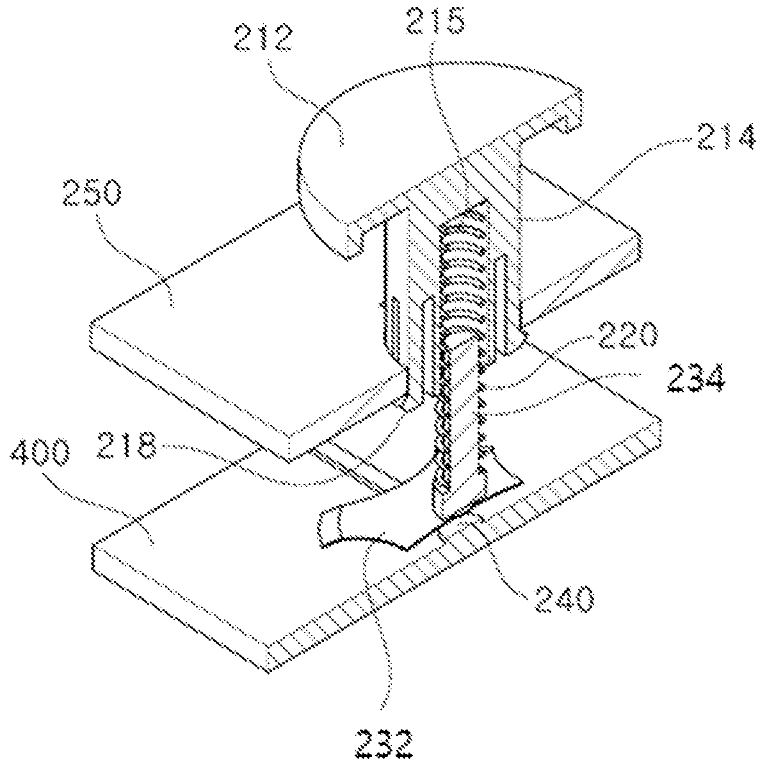
FIG. 9 is a prespective cross-sectional view of the computer input device of FIG. 8.

Example 2 is an example of a metal dome membrane-type computer input device 200. FIG. 8 shows an exploded perspective view of the metal dome membrane-type computer input device 200, and FIG. 9 shows a cross-sectional view of the metal dome membrane-type computer input device 200.

The metal dome membrane-type computer input device 200 may be configured by including a button 210, a spring (first elastic unit 220), a metal dome membrane (second elastic unit 230), and a switch 240.

The button 210 may be configured by including a cap unit 212 and an extension unit 214. The cap unit 212 is positioned on an upper portion of the button 210, and corresponds to a configuration to which an external force is applied. The extension unit 214 is formed to extend from a lower portion of the cap unit 212, and may have a groove portion 215 formed to be opened in a downward direction.

A portion or entirety of the spring 220 may be mounted in the groove portion 215, and through this, it is possible to implement stable position maintenance and stable elastic force provision of the spring 220.

The metal dome membrane 230 may include a membrane main body 232 and a membrane protrusion portion 234. The spring 220 may be fitting-coupled to the membrane protrusion portion 234, and through this, it is possible to implement stable position maintenance and stable elastic force provision of the spring 220. The switch 240 may be implemented in a form coupled to the PCB.

According to the embodiment, the metal dome membrane-type computer input device 200 may be configured by further including a fixing unit 250.

A through hole 252 may be formed in the fixing unit 250, and the extension unit 214 may be through-coupled to the through hole 252. Through this through coupling, movements in upward and downward directions of the extension unit 214, that is, the button 210, may be guided stably.

According to the embodiment, one or more sliding protrusions 216 may be formed to protrude from the side surface of the extension unit 214, and a sliding slot 254 to which the sliding protrusions 216 are fitting-coupled may be formed in the through hole 252.

When the sliding protrusions 216 are fitting-coupled to the sliding slot 254, rotation of the extension unit 214 or the button 210 is prevented in a state where the extension unit 214 is through-coupled to the through hole 252. Therefore, the button 210 may be driven more stably, and furthermore, the computer input device 200 itself may be driven more stably.

According to the embodiment, one or more hooking protrusion portions 218 may be formed to protrude from the lower portion of the side surface of the extension unit 214. Since the hooking protrusion portions 218 are hooking-coupled to the lower portion of the fixing unit 250 in a state where the extension unit 214 is through-coupled to the through hole 252, a phenomenon in which the button 210 is separated from the through hole 252 may be prevented.

FIGS. 10A-10D are views showing the operation method of the metal dome membrane-type computer input device 200. In FIGS. 10A-10D, it is assumed that the elastic modulus of the spring 220 is larger than the elastic modulus of the metal dome membrane 230.

Figures 10A, 10B, 10C, 10D:
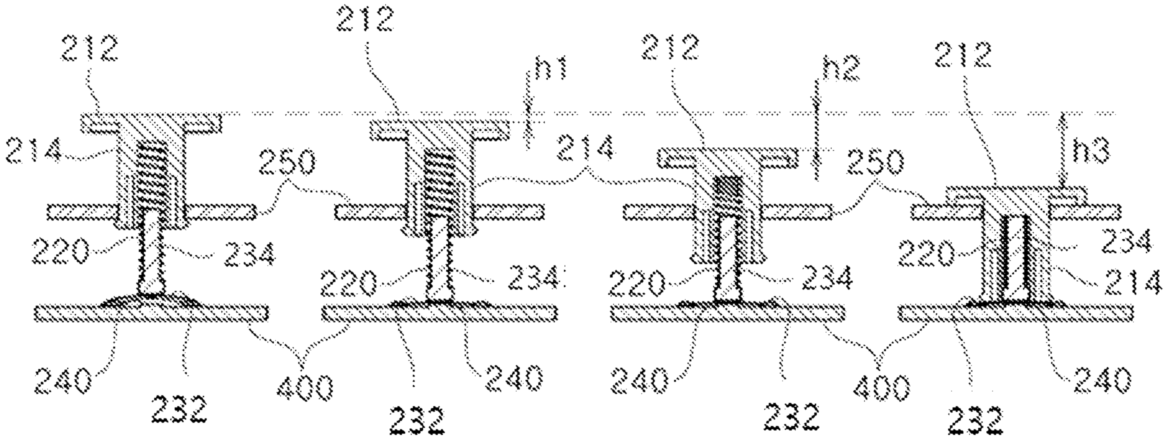
FIGS. 10A-10D are cross-sectional views of the computer input device of FIG. 9 in varying positions of operation.

FIG. 10A shows a basic state in which no external force is applied.

In this case, the button 210 is positioned at the uppermost end, the spring 220 has a free length that is not compressed or deformed, and the metal dome membrane 230 is also in a basic state that is an uncompressed or undeformed state.

FIG. 10B shows a state in which the switch 240 is turned on as an external force is applied thereto. That is, FIG. 10B shows an operation in the on section.

The button 210 descends by h1 due to the applied external force, and the spring 220 is hardly compressed or is compressed to have a very small length due to a relatively large elastic modulus. The metal dome membrane 230 is compressed in a downward direction by h1 or a length adjacent to h1 due to a relatively small elastic modulus.

The compressed metal dome membrane 230 touches the switch 240 so that the switch 240 is turned on. Since the metal dome membrane 230 is in a state of being in contact with the switch 240, it can no longer be compressed in a downward direction. That is, the metal dome membrane 230 acts as a rigid body.

FIG. 10C shows a state in which the external force is sustained due to the inertia of the user's pressing. That is, FIG. 10C shows an operation in the extra section.

Since the metal dome membrane 230 can no longer be compressed in a downward direction, compression or deformation due to an external force occurs in the spring 220. That is, the spring 220 is compressed in a downward direction by a length of h2-h1.

Since the spring 220 has a relatively large elastic modulus, a relatively larger elastic force (elastic force of the spring) than that of the case of FIG. 10B acts in a direction opposite to the external force. Accordingly, the user's pressing is further hindered by the large elastic force, and as a result, the lowering speed of the button 210 due to the user's pressing is reduced.

FIG. 10D shows a state in which the button 210 no longer descends.

As a result of the user's pressing being further hindered by the large elastic force, the user's external force and the elastic force cancel each other out so that the button 210 does not descend. In this case, the spring 220 is additionally compressed by a length of h3-h2 compared to the case of FIG. 10C.

Example 3—Mechanical Type

Figure 11:
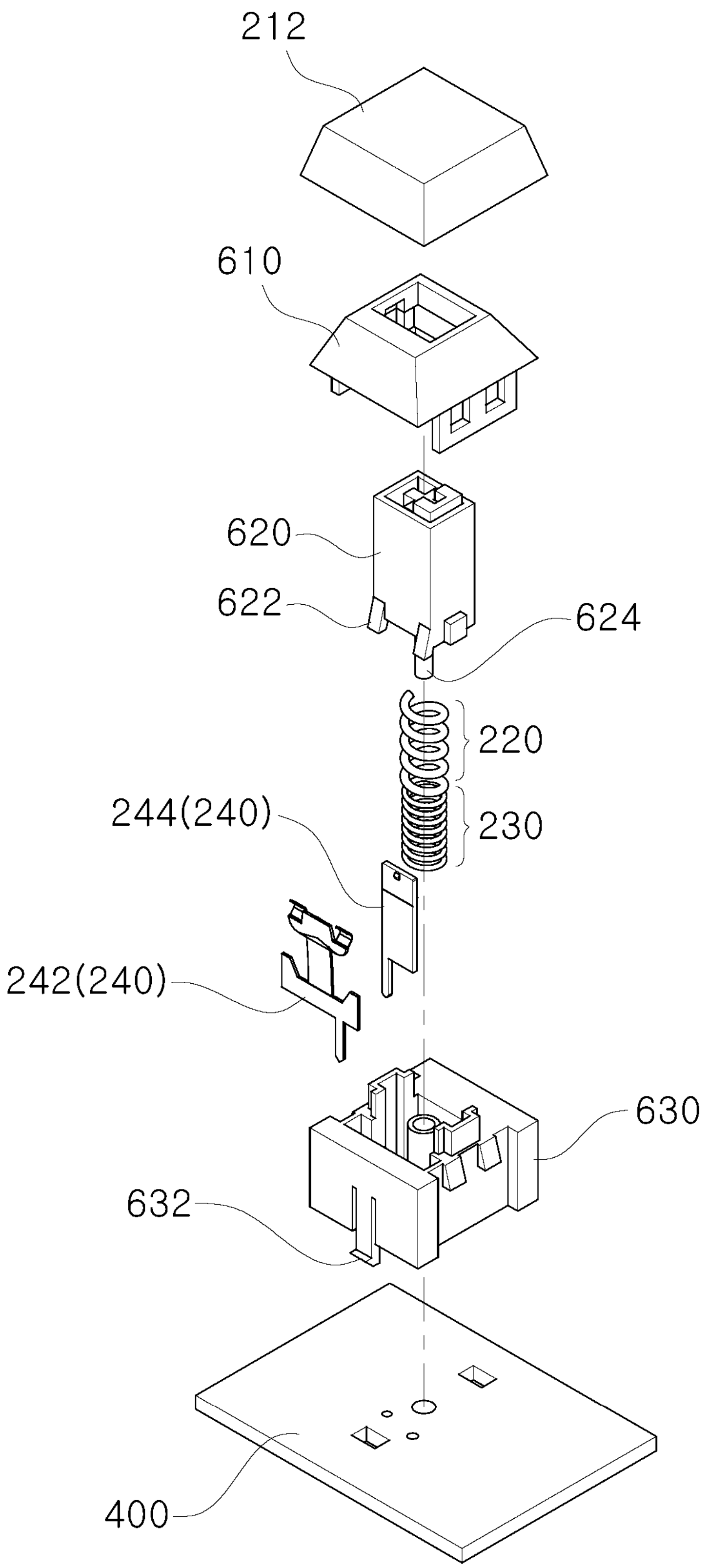
FIG. 11 is an exploded perspective view of mechanical computer input device according to the present invention.
Figure 12:
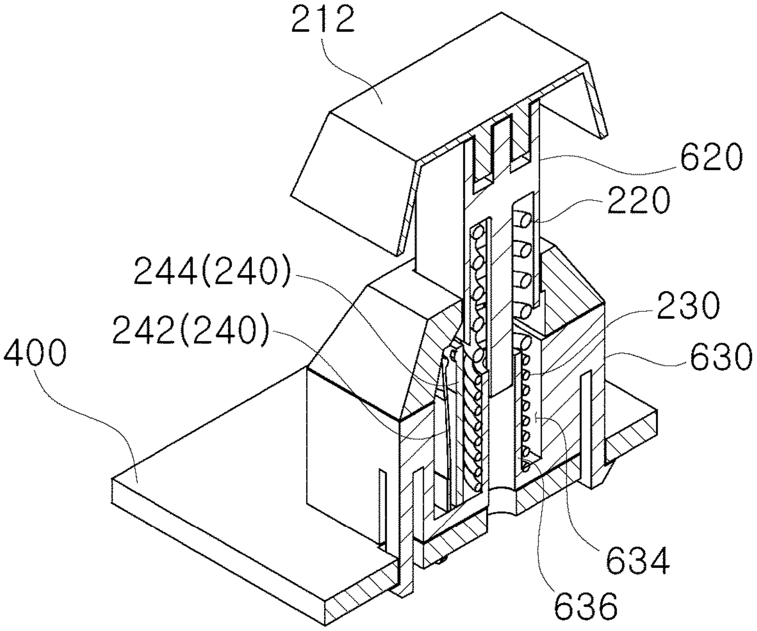
FIG. 12 is a prespective cross-sectional view of the computer input device of FIG. 11.

Example 3 is an example of a mechanical computer input device 200. FIG. 11 shows an exploded perspective view of the mechanical computer input device 200, and FIG. 12 shows a cross-sectional view of the mechanical computer input device 200.

The mechanical computer input device 200 may be configured by including a button 210, a first spring (first elastic unit 220), a second spring (second elastic unit 230), and a switch 240.

The button 210 may be configured by including a cap unit 212, an upper structure 610, and a pressing rod 620. The cap unit 212 is positioned on the upper portion of the button 210 and corresponds to a configuration to which an external force is applied. The upper structure 610 may fix the position of the cap unit 212, and may stably maintain the positions of the pressing rod 620, the first spring 220, and the second spring 230 through coupling to a lower structure 630 described later.

A pressing rod protrusion portion 624 and a pressing rod protrusion 622 may be formed on the pressing rod 620. The pressing rod protrusion portion 624 is formed to protrude from the lower surface of the pressing rod 620, and the entirety or portion of the first spring 220 may be fitting-coupled to the pressing rod protrusion portion 624. Through this, it is possible to implement stable position maintenance and stable elastic force provision of the first spring 220 and the second spring 230.

The pressing rod protrusion 622 is formed to protrude from the side surface where the switch 240 is positioned among the side surfaces of the pressing rod 620. The pressing rod protrusion 622 controls contact and non-contact between a first electrode 242 and a second electrode 244 by upward and downward movements, thereby making it possible for the switch 240 to be turned on or off.

The first spring 220 is positioned on a lower portion of the pressing rod 620, the second spring 230 is positioned on a lower portion of the first spring 220, and the first spring 220 and the second spring 230 are in contact with each other. The first spring 220 and the second spring 230 constitute discontinuous springs having different elastic moduli.

According to the embodiment, the mechanical computer input device 200 may be configured by further including the lower structure 630 positioned between the second spring 230 and a PCB 400. The second spring 230 and the switch 240 may be coupled to the lower structure 630. A substrate fixing unit 632 may be formed to protrude in a downward direction from a lower portion of the lower structure 630, and the lower structure 630 and the PCB 400 may be coupled to each other through the substrate fixing unit 632.

A space 634 with an open upper side is formed in a central portion of the lower structure 630, and a lower protrusion portion 636 formed to protrude upward is formed in a central portion of the space 634. The second spring 230 is fitting-coupled to the lower protrusion portion 636, and it may be possible to implement stable position maintenance and stable elastic force provision of the first spring 220 and the second spring 230.

FIGS. 13A-13D are views showing an operation method of the mechanical computer input device 200. In FIGS. 13A-13D, it is assumed that the elastic modulus of the first spring 220 is larger than the elastic modulus of the second spring 230.

Figures 13A, 13B, 13C, 13D:
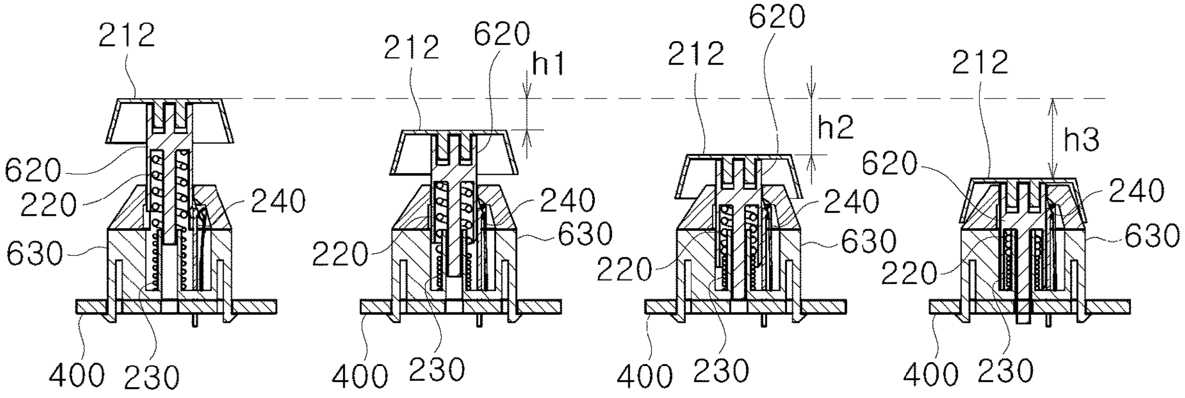
FIGS. 13A-13D are cross-sectional views of the computer input device of FIG. 12 in varying positions of operation.

FIG. 13A shows a basic state in which no external force is applied.

In this case, the button 210 is positioned at the uppermost end, the first spring 220 has a free length that is not compressed or deformed, and the second spring 230 is also in a basic state that is an uncompressed or undeformed state.

FIG. 13B shows a state in which the switch 240 is turned on as an external force is applied thereto. That is, FIG. 13B shows an operation in the on section.

The button 210 descends by h1 due to the applied external force, and the upper structure 620 also descends by h1. The first spring 220 is hardly compressed or is compressed to have a very small length due to a relatively large elastic modulus. The second spring 230 is compressed in a downward direction by h1 or a length adjacent to h1 due to a relatively small elastic modulus.

The lowered upper structure 620 touches the switch 240 so that the switch 240 is turned on. Since the second spring 230 is in a maximally compressed state, it can no longer be compressed in a downward direction. That is, the second spring 230 acts as a rigid body.

FIG. 13C shows a state in which the external force is sustained due to the inertia of the user's pressing. That is, FIG. 13C shows an operation in the extra section.

Since the second spring 230 can no longer be compressed in a downward direction, compression or deformation due to an external force occurs in the first spring 220. That is, the spring 220 is compressed in a downward direction by a length of h2-h1.

Since the first spring 220 has a relatively large elastic modulus, a relatively larger elastic force (elastic force of the spring) than that of the case of FIG. 13B acts in a direction opposite to the external force. Accordingly, the user's pressing is further hindered by the large elastic force, and as a result, the lowering speed of the button 210 due to the user's pressing is reduced.

FIG. 13D shows a state in which the button 210 no longer descends.

As a result of the user's pressing being further hindered by the large elastic force, the user's external force and the elastic force cancel each other out so that the button 210 does not descend. In this case, the first spring 220 is additionally compressed by a length of h3-h2 compared to the case of FIG. 13C.

Example 4—Electronic Type

Figure 14:
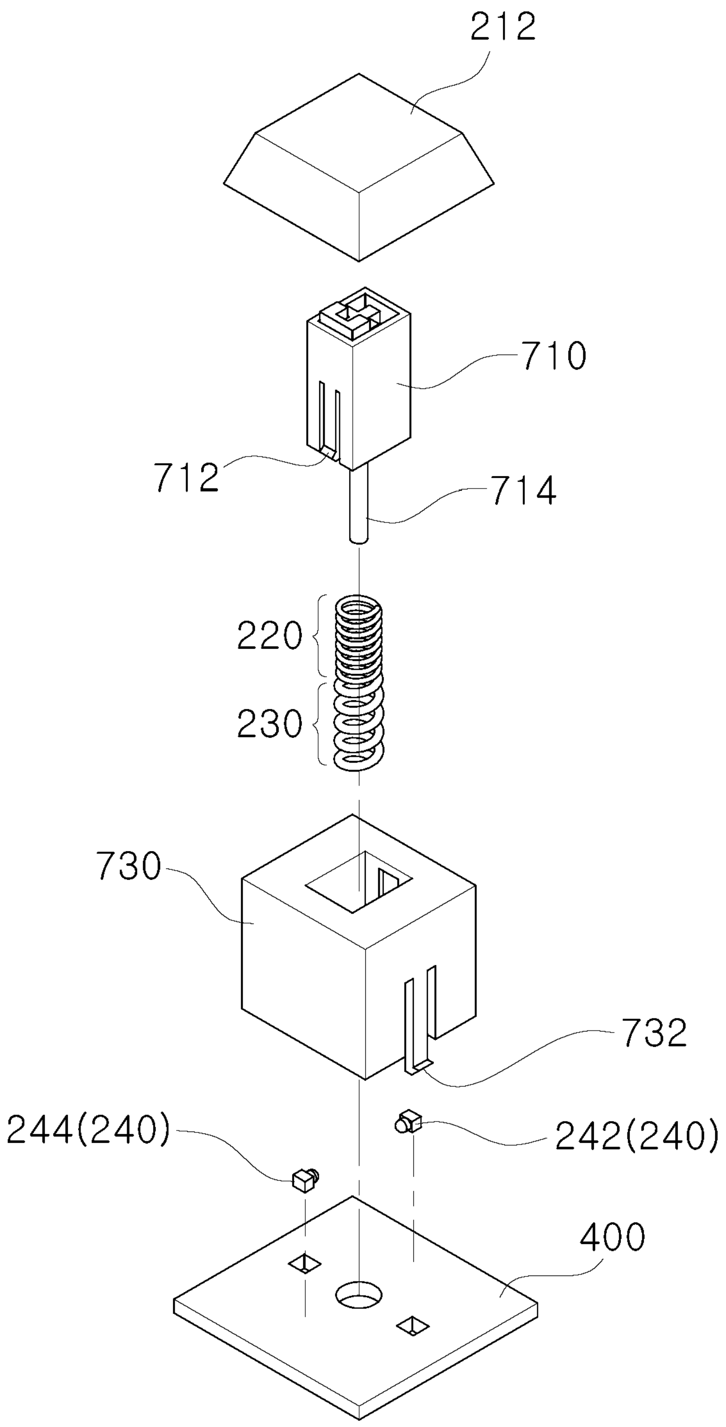
FIG. 14 is an exploded perspective view of an optical computer input device according to the present invention.
Figure 15:
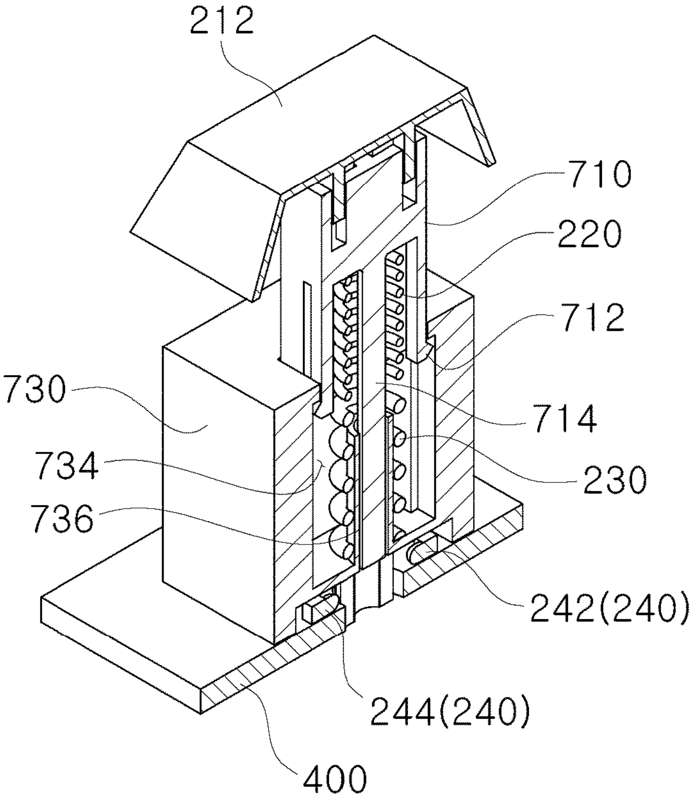
FIG. 15 is a prespective cross-sectional view of the computer input device of FIG. 14.

Example 4 is an example of an electronic computer input device 200. FIG. 14 shows an exploded perspective view of the electronic computer input device 200, and FIG. 15 shows a cross-sectional view of the electronic computer input device 200.

The electronic computer input device 200 may be configured by including a button 210, a first spring (first elastic unit 220), a second spring (second elastic unit 230), and a switch 240.

The button 210 may be configured by including a cap unit 212 and a pressing rod 710. The cap unit 212 is positioned on an upper portion of the button 210 and corresponds to a configuration to which an external force is applied. The pressing rod 710 may be coupled to the cap unit 212, and may have a pressing rod protrusion portion 714 formed thereon.

The pressing rod protrusion portion 714 is formed to protrude from the lower surface of the pressing rod 710, and corresponds to a configuration that turns on or off the switch 240 through the descent due to an external force and the ascent due to release of the external force.

The entirety or portion of the first spring 220 may be fitting-coupled to the pressing rod protrusion portion 714. Through this, it is possible to implement stable position maintenance and stable elastic force provision of the first spring 220 and the second spring 230.

The first spring 220 is positioned on a lower portion of the pressing rod 710, the second spring 230 is positioned on a lower portion of the first spring 220, and the first spring 220 and the second spring 230 are in contact with each other. The first spring 220 and the second spring 230 constitute discontinuous springs having different elastic moduli.

The switch 240 may be configured by including an optical transmitter 242 and an optical receiver 244.

According to the embodiment, the electronic computer input device 200 may be configured by further including a lower structure 730 positioned between the second spring 230 and the PCB 400.

A space 734 with an open upper side is formed in a central portion of the lower structure 730, and a lower protrusion portion 736 formed to protrude upward is formed in a central portion of the space 734. The second spring 230 is fitting-coupled to the lower protrusion portion 736, and it is possible to implement stable position maintenance and stable elastic force provision of the first spring 220 and the second spring 230.

According to the embodiment, one or more pressing rod hooking portions 712 may be formed to protrude from the lower side surface of the pressing rod 710. The pressing rod hooking portions 712 are hooking-coupled to the space 734, and through this, configurations of the electronic computer input device 200 may stably maintain their positions.

FIGS. 16A-16D are views showing an operation method of the electronic computer input device 200. In FIGS. 16A-16D, it is assumed that the elastic modulus of the first spring 220 is larger than the elastic modulus of the second spring 230.

Figures 16A, 16B, 16C, 16D:
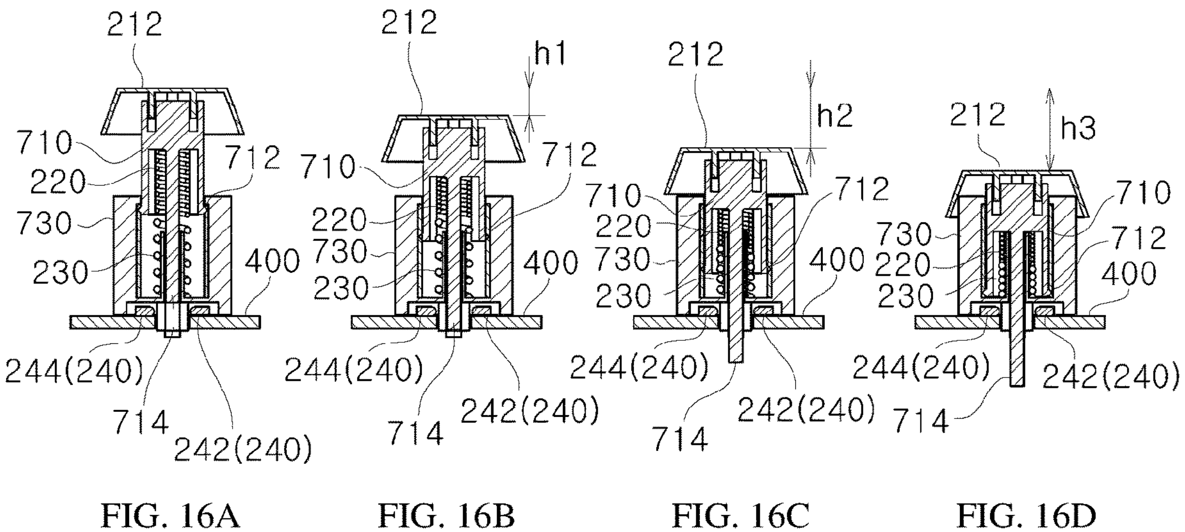
FIGS. 16A-16D are cross-sectional views of the computer input device of FIG. 15 in varying positions of operation.

FIG. 16A shows a basic state in which no external force is applied.

In this case, the button 210 is positioned at the uppermost end, the first spring 220 has a free length that is not compressed or deformed, and the second spring 230 is also in a basic state that is an uncompressed or undeformed state.

FIG. 16B shows a state in which the switch 240 is turned on as an external force is applied thereto. That is, FIG. 16B shows an operation in the on section.

The button 210 descends by h1 due to the applied external force, and the upper structure 710 also descends by h1. The first spring 220 is hardly compressed or compressed to have a very small length due to a relatively large elastic modulus. The second spring 230 is compressed in a downward direction by h1 or a length adjacent to h1 due to a relatively small elastic modulus. Since the second spring 230 is in a maximally compressed state, it can no longer be compressed in a downward direction. That is, the second spring 230 acts as a rigid body.

The pressing rod protrusion portion 714 of the lowered upper structure 710 blocks light output from the optical transmitter 242 from being received by the optical receiver 244. Therefore, the switch 240 is turned on.

FIG. 16C shows a state in which the external force is sustained due to the inertia of the user's pressing. That is, FIG. 16C shows an operation in the extra section.

Since the second spring 230 can no longer be compressed in a downward direction, compression or deformation due to an external force occurs in the first spring 220. That is, the spring 220 is compressed in a downward direction by a length of h2-h1.

Since the first spring 220 has a relatively large elastic modulus, a relatively larger elastic force (elastic force of the spring) than that of the case of FIG. 16B acts in a direction opposite to the external force. Accordingly, the user's pressing is further hindered by the large elastic force, and as a result, the lowering speed of the button 210 due to the user's pressing is reduced.

FIG. 16D shows a state in which the button 210 no longer descends.

As a result of the user's pressing being hindered by the larger elastic force, the user's external force and the elastic force cancel each other out so that the button 210 does not descend. In this case, the first spring 220 is additionally compressed by a length of h3-h2 compared to the case of FIG. 16C.

Example 5—Compression Spring

Example 5 is another example of a computer input device 200, and is an example in which a spring (first elastic unit 220) is included in a compressed state (compression spring).

Figure 17:
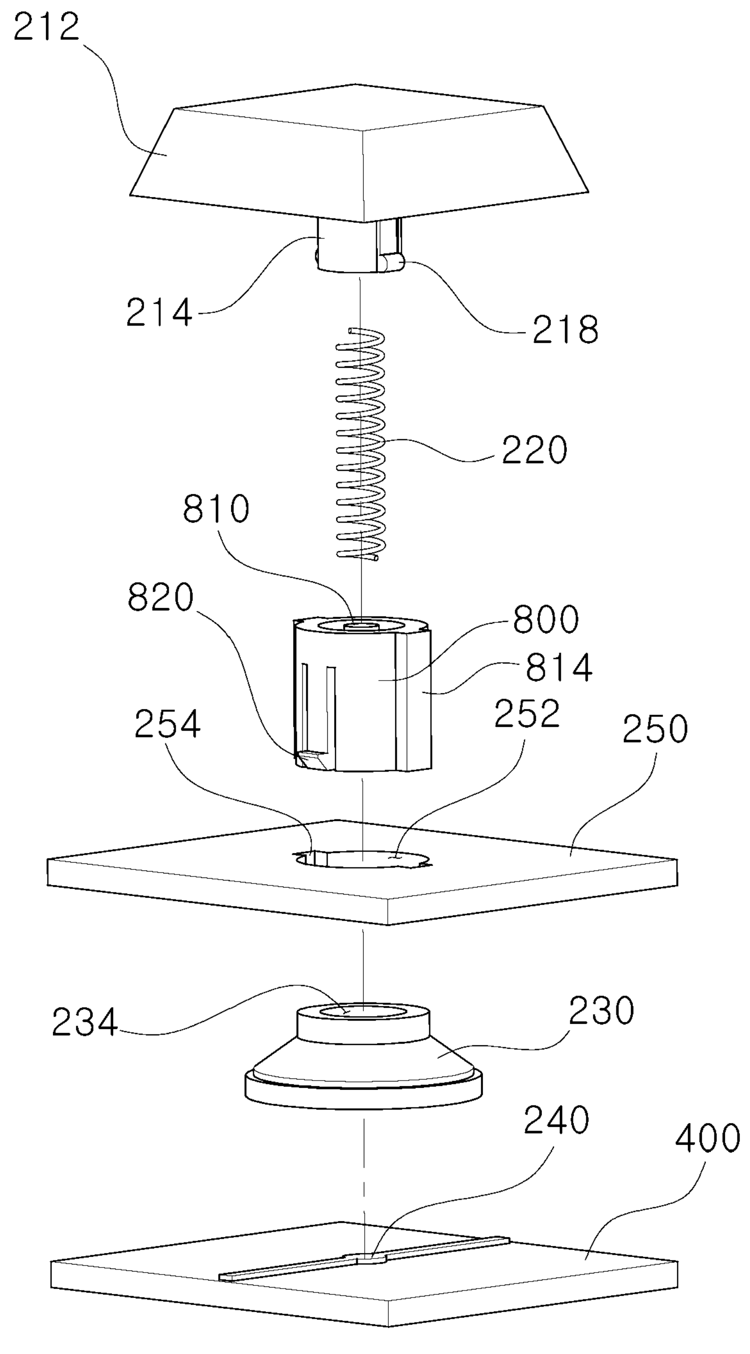
FIG. 17 is an exploded perspective view of another embodiment of a computer input device according to the present invention.
Figure 18:
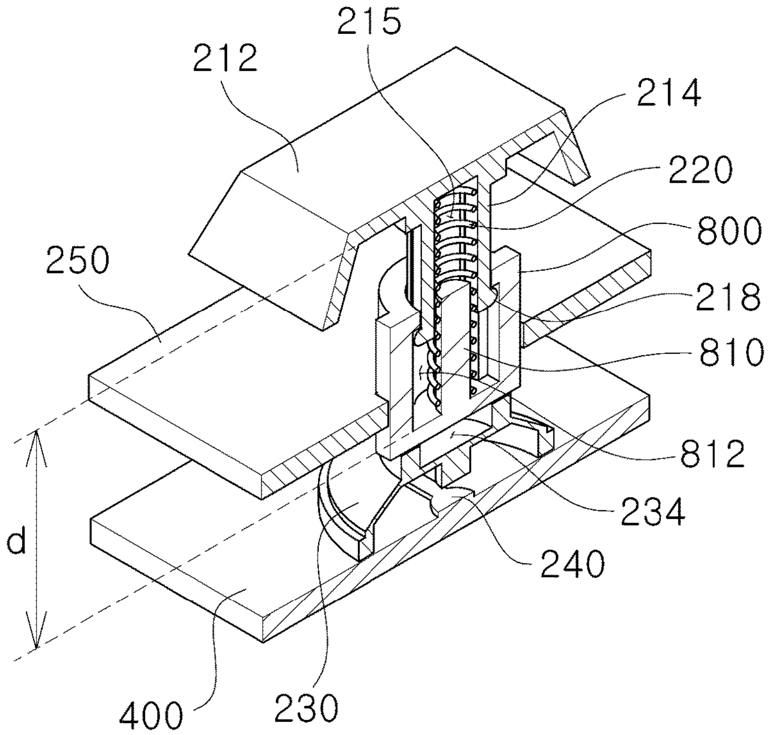
FIG. 18 is a prespective cross-sectional view of the computer input device of FIG. 17.

FIG. 17 is an exploded perspective view for explaining Example 5, and FIG. 18 is a cross-sectional view for explaining Example 5.

The computer input device 200 may be configured by including a button 210, the spring 220, a moving unit 800, a membrane (second elastic unit 230), and a switch 240.

The button 210 may be configured by including a cap unit 212 and an extension unit 214. The cap unit 212 is positioned on an upper portion of the button 210 and corresponds to a configuration to which an external force is applied. The extension unit 214 is formed to extend from a lower portion of the cap unit 212 and may have a groove portion 215 formed to be opened in a downward direction.

A portion or entirety of the spring 220 may be mounted in the groove portion 215, and through this, it is possible to implement stable position maintenance and stable elastic force provision of the spring 220.

The membrane 230 corresponds to a configuration that provides the button 210 with elastic force in an upward direction. When the membrane 230 is deformed in a downward direction by an external force and contacts the switch 240, the switch 240 is turned on, and when the external force is released to release the contact between the membrane 230 and the switch 240, the switch 240 is turned off.

The moving unit 800 is positioned between the button 210 and the membrane 230 and corresponds to a configuration for transmitting an external force applied to the button 210 to the membrane 230. In addition, the moving unit 800 also corresponds to a configuration for compressing the spring 220.

Compression of the spring 220 is implemented by a coupling structure between the extension unit 214 and the moving unit 800. One or more hooking protrusion portions 218 are formed on the lower side surface of the extension unit 214, and the hooking protrusion portions 218 may be hooking-coupled to the upper side of the moving unit 800 within a space 812 formed in the moving unit 800.

In a state where the hooking protrusion portions 218 and the moving unit 800 are hooking-coupled, the length d from the uppermost end position in the groove portion 215 to the lowermost end position in the space 812 is shorter than the free state length of the spring 220. Accordingly, the spring 220 positioned between the uppermost end position in the groove portion 215 and the lowermost end position in the space 812 is compressed.

The compressed spring 220 may provide the button 210 with a relatively larger elastic force than the membrane 230 in the entirety or portion of the extra section, which leads to the result of reducing the lowering speed of the button 210 due to the user's pressing.

According to the embodiment, the computer input device 200 may be configured by further including a fixing unit 250.

A through hole 252 is formed in the fixing unit 250, and the moving unit 800 may be through-coupled to the through hole 252. Through this through coupling, upward and downward movements of the moving unit 800, that is, the button 210, may be guided stably.

According to the embodiment, more sliding protrusions 814 may be formed to protrude from the side surface of the moving unit 800, and a sliding slot 254 to which the sliding protrusions 814 are fitting-coupled may be formed in the through hole 252.

When the sliding protrusions 814 are fitting-coupled to the sliding slot 254, rotation of the moving unit 800 or the button 210 is prevented in a state where the moving unit 800 is through-coupled to the through hole 252. Therefore, the button 210 may be driven more stably, and furthermore, the computer input device 200 itself may be driven more stably.

According to the embodiment, one or more hooking protrusion portions 820 may be formed to protrude from a lower portion of the side surface of the moving unit 800. Since the hooking protrusion portions 820 are hooking-coupled to the lower portion of the fixing unit 250 in a state where the moving unit 800 is through-coupled to the through hole 252, a phenomenon in which the button 210 is separated from the through hole 252 may be prevented.

FIGS. 19A-19D are views showing an operation method of the computer input device 200.

Figures 19A, 19B, 19C, 19D:
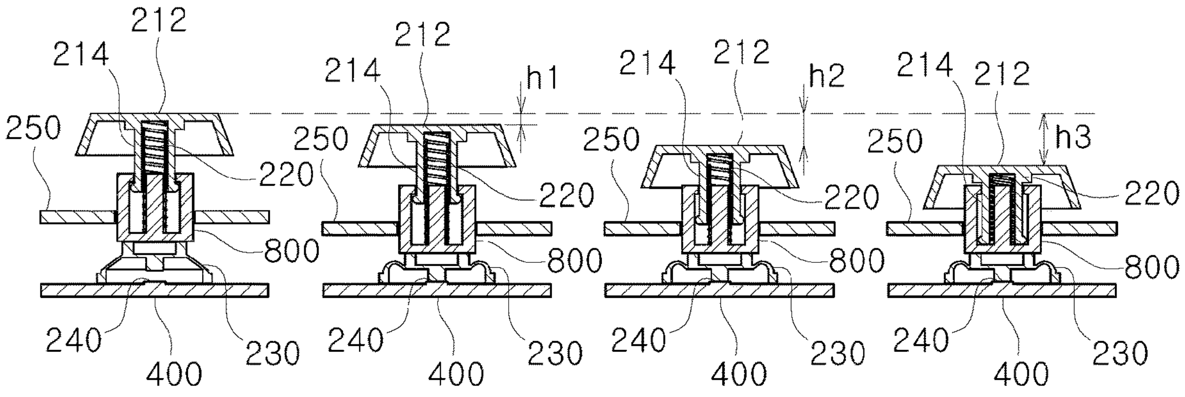
FIGS. 19A-19D are cross-sectional views of the computer input device of FIG. 18 in varying positions of operation.

FIG. 19A shows a basic state in which no external force is applied.

In this case, the button 210 is positioned at the uppermost end, the spring 220 has a compressed length d, and the membrane 230 is in a basic state that is an uncompressed or undeformed state.

FIG. 19B shows a state in which the switch 240 is turned on as an external force is applied thereto. That is, FIG. 19B shows an operation in the on section.

The button 210 is lowered by h1 due to the applied external force, and the spring 220 is hardly compressed or compressed to have a very small length due to a relatively large elastic force. The membrane 230 is compressed in a downward direction by h1 or a length adjacent to h1 due to a relatively small elastic force.

The compressed membrane 230 touches the switch 240 so that the switch 240 is turned on. Since the membrane 230 is in a state of being in contact with the switch 240, it can no longer be compressed in a downward direction. That is, the membrane 230 acts as a rigid body.

FIG. 19C shows a state in which the external force is sustained due to the inertia of the user's pressing. That is, FIG. 19C shows an operation in the extra section.

Since the membrane 230 can no longer be compressed in a downward direction, compression or deformation due to an external force occurs in the spring 220. That is, the spring 220 is compressed in a downward direction by a length of h2-h1.

Since the spring 220 has a relatively large elastic force, a relatively larger elastic force (elastic force of the spring) than that of the case of FIG. 19B acts in a direction opposite to the external force. Accordingly, the user's pressing is further hindered by the large elastic force, and as a result, the lowering speed of the button 210 due to the user's pressing is reduced.

FIG. 19 D shows a state in which the button 210 no longer descends.

As a result of the user's pressing being hindered by the larger elastic force, the user's external force and the elastic force cancel each other out so that the button 210 does not descend. In this case, the spring 220 is additionally compressed by a length of h3-h2 compared to the case of FIG. 19C.

The above-described description of the present disclosure is for illustrative purposes, and those skilled in the art to which the present disclosure pertains will be able to understand that the present disclosure can be easily modified into other specific forms without changing the technical spirit or essential features of the present disclosure. Therefore, the embodiments described above are illustrative in all aspects, and should not be understood as being limited. For example, each component described as a single form may be implemented in a distributed manner, and similarly, components described as being distributed may be implemented in a combined form.

The scope of the present disclosure is indicated by the claims described later rather than the above-described detailed description, and all changes or modified forms derived from the meaning and scope of the claims and equivalent concepts thereof should be interpreted as being included in the scope of the present disclosure.

The invention claimed is:

1. A computer input device comprising:

a button that is movable by an external force;

an elastic unit that is positioned on a lower portion of the button, is deformed or compressed by the movement of the button, and provides an elastic force in response to the movement of the button; and a switch that is turned on or off by the movement of the button, wherein the button is movable in an on section, which is a section having a length defined from an uppermost end position to a position where the switch is turned on, and an extra section, which is a section having a length defined up to a position that is lower than the on section, wherein the elastic unit is a spring of which an elastic modulus continuously increases or decreases along a same direction as a direction of the external force, a portion having a relatively small elastic modulus is compressed by the external force in the on section, and a portion having a relatively large elastic modulus is compressed by the external force in an entirety or portion of the extra section.

2. The computer input device of claim 1, wherein a value of dividing the length of the extra section by the length of the on section is 1 or more obtained.

3. The computer input device of claim 1, wherein a sum of the lengths of the on section and the extra section is 4 mm or more.

4. The computer input device of claim 1, wherein a sum of the lengths of the on section and the extra section is 5 mm or more.

5. The computer input device of claim 1, wherein a sum of the lengths of the on section and the extra section is 8 mm or more.

6. The computer input device of claim 1, wherein the button includes:

a cap unit to which the external force is applied; and an extension unit which is formed to extend from a lower portion of the cap unit and has therein a space with an open lower side, and an entirety or portion of the elastic unit is mounted in the space.

7. The computer input device of claim 6, further comprising a fixing unit which has a through hole to which the extension unit is through-coupled, and guides the movement of the extension unit.

8. The computer input device of claim 7, wherein the extension unit has one or more sliding protrusions formed to protrude from a side surface thereof, the through hole has a sliding slot to which the one or more sliding protrusions are fitting-coupled, and the button is prevented from being rotated by fitting-coupling between the one or more sliding protrusions and the sliding slot.

9. The computer input device of claim 7, wherein the extension unit has one or more hooking protrusion portions formed to protrude from a lower portion of a side surface thereof, and hooking-coupling between the one or more hooking protrusion portions and the fixing unit prevents the button from being separated from the through hole.

10. The computer input device of claim 1, wherein the elastic unit includes:

a first elastic unit which is positioned on a lower portion of the button, and is compressed or deformed in an entirety or portion of the extra section; and a second elastic unit which is positioned on a lower portion of the first elastic unit, has a smaller elastic modulus than the first elastic unit, and is compressed or deformed in the on section.

11. The computer input device of claim 10, further comprising a moving unit which is positioned between the button and the second elastic unit and has a space formed therein, wherein the button includes:

a cap unit to which the external force is applied; and an extension unit which is formed to extend from the lower portion of the cap unit and has therein a space with an open lower side, and one or more hooking protrusion portions formed to protrude from the lower portion of a side surface thereof, and the first elastic unit is the spring which is compressed to provide an elastic force larger than an elastic force, provided by the second elastic unit, by hooking-coupling between the moving unit and the one or more hooking protrusion portions.

* * * * *